June 18, 1935.  C. A. ROEDER  2,005,167
CHANGE SPEED TRANSMISSION
Filed Sept. 4, 1934   4 Sheets-Sheet 1
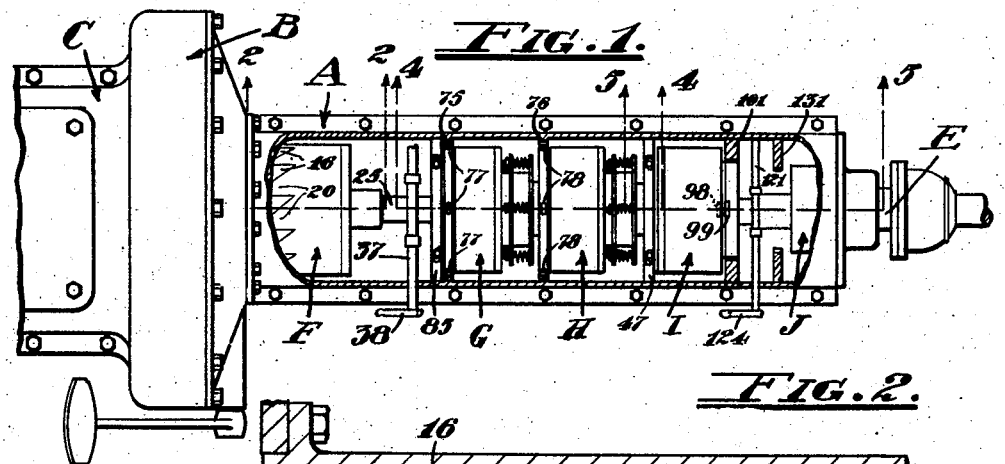
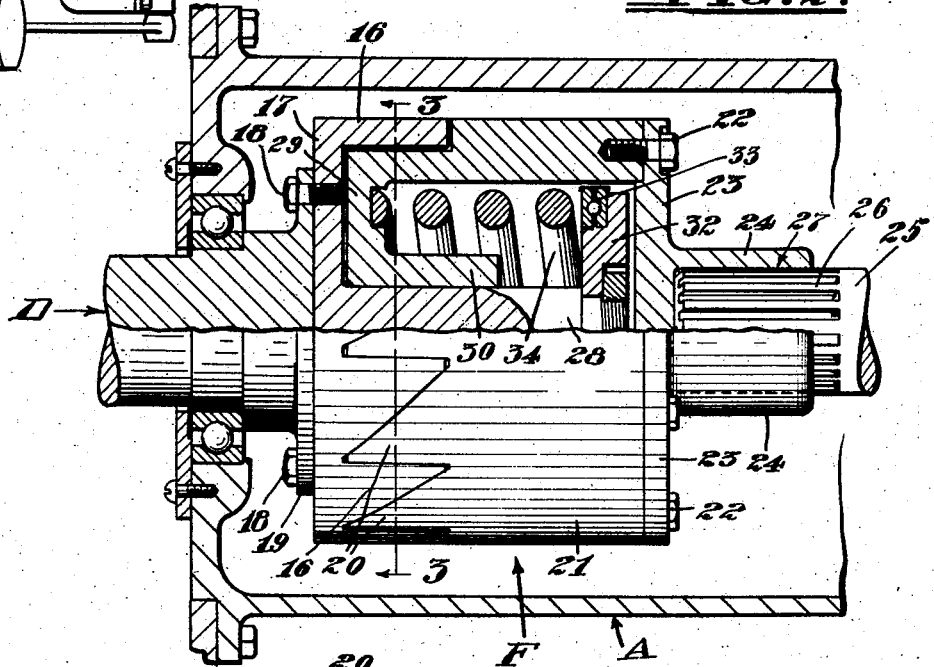
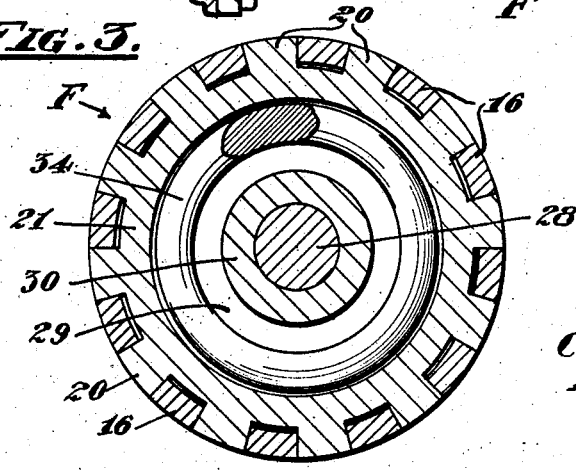
Inventor
Clyde A. Roeder
By
Att'y.

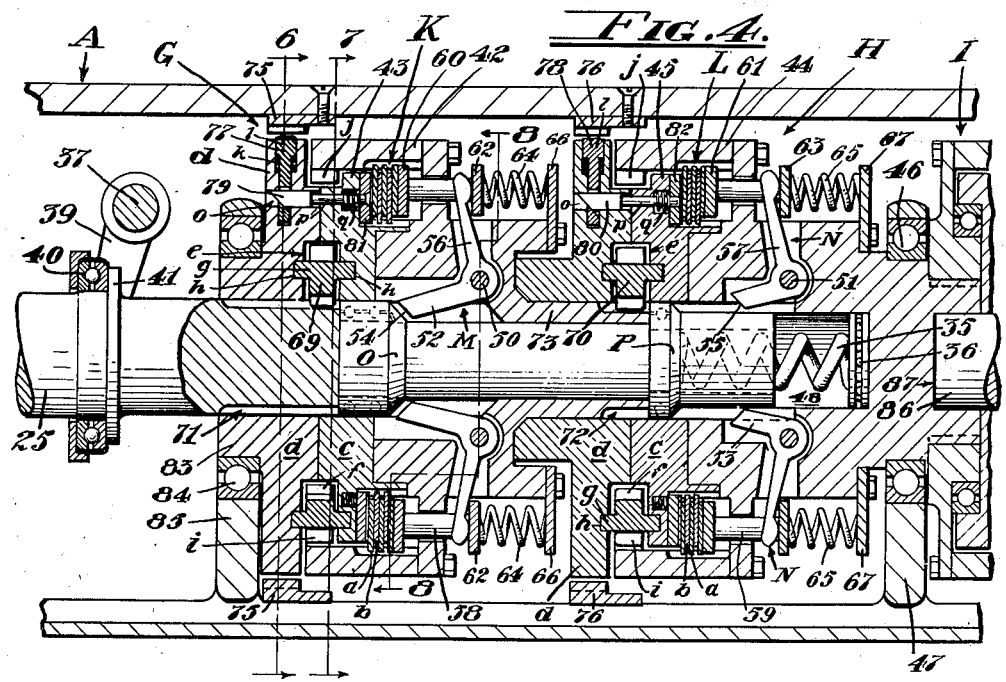

June 18, 1935.  C. A. ROEDER  2,005,167
CHANGE SPEED TRANSMISSION
Filed Sept. 4, 1934    4 Sheets-Sheet 3
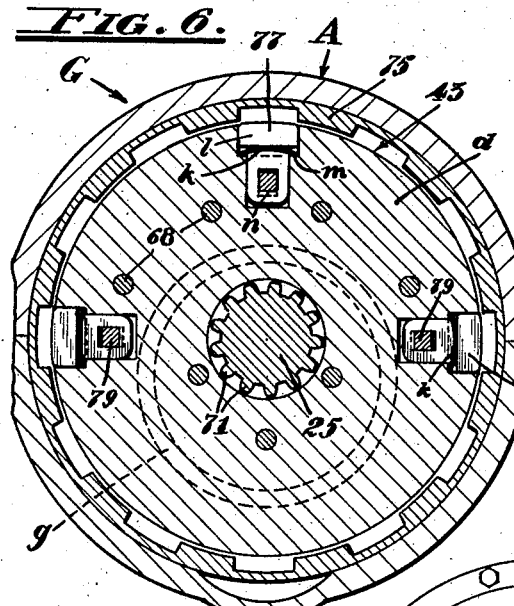
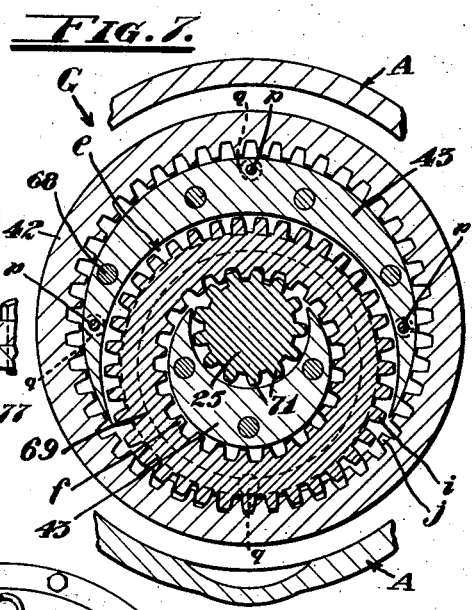
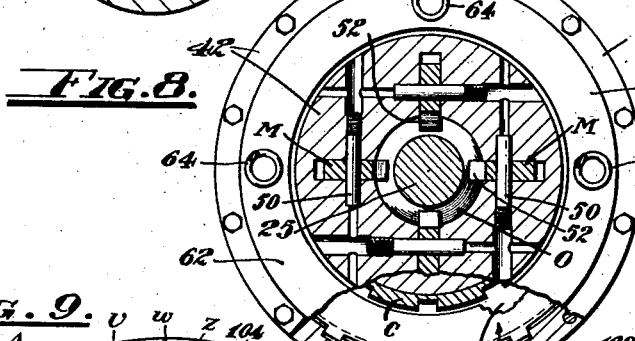
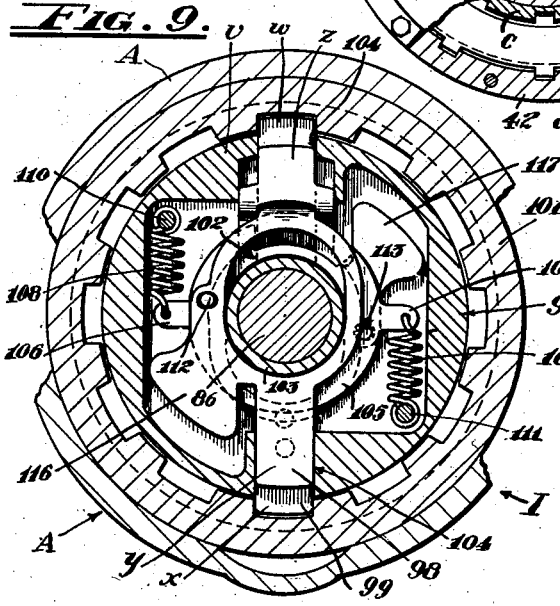
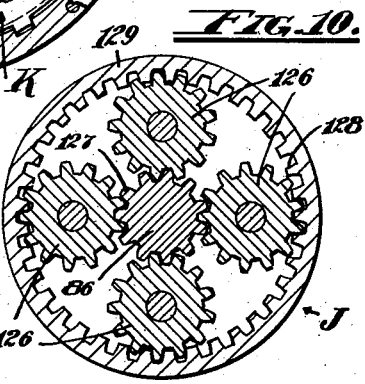
Inventor
Clyde A. Roeder
By
Att'y.

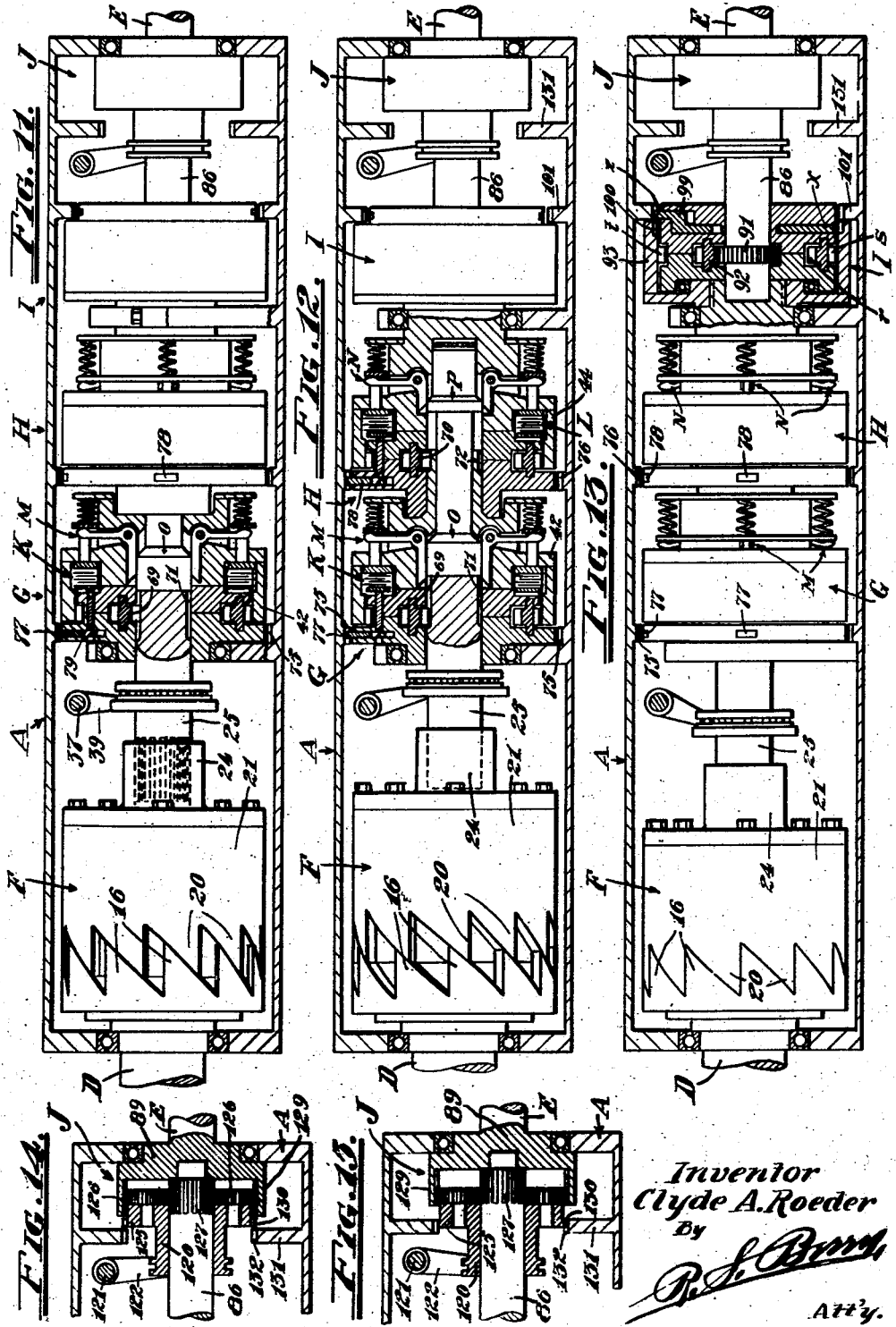

Patented June 18, 1935

2,005,167

UNITED STATES PATENT OFFICE 2,005,167

CHANGE SPEED TRANSMISSION

Clyde A. Roeder, Omaha, Nebr.

Application September 4, 1934, Serial No. 742,600

6 Claims. (Cl. 74—259)

This invention relates to a change speed transmission mechanism of the semi-automatic type such as is employed in motor driven vehicles.

An object of the invention is to provide a change speed mechanism in which various gear ratios may be obtained between a driving and a driven shaft either under automatic or manual control.

Another object is to provide a change speed mechanism of the above character in which automatic control thereof is effected by variations of load imposed on and resisting operation of the driven shaft in co-operation with torque of the engine drive shaft and in which the various change speed ratios may be obtained manually through the change speed mechanism independent of the load on the driven shaft.

Another object is to provide a change speed mechanism of the above character embodying an over drive arrangement whereby the driven shaft may be rotated at increased speeds relative to the drive shaft while in gear connection with the drive shaft.

Another object is to provide a construction in the change speed transmission whereby rapid change in gear ratios may be effected without jolt or jar and in which the parts are so formed and constructed as to facilitate their assemblage and disassemblage.

A further object is to provide a change speed mechanism of the above character which is efficient and dependable in its operation.

With the foregoing objects in view together with such other objects and advantages as may subsequently appear the invention primarily resides in the parts and in the combination, construction and arrangement of parts hereinafter described and claimed and illustrated by way of example in the accompanying drawings in which:

Fig. 1 is a plan view of the transmission mechanism with portions broken away showing the parts disposed in their normal position:

Fig. 2 is a detail in section and elevation taken on the line 2—2 of Fig. 1 showing the automatic torque operated change speed controller:

Fig. 3 is a view in section and elevation taken on the line 3—3 of Fig. 2:

Fig. 4 is a view in section and elevation taken on the line 4—4 of Fig. 1 readable in continuation of the view shown in Fig. 2:

Fig. 5 is a view in section and elevation taken on the line 5—5 of Fig. 1, being in continuation of the right hand side of the view shown in Fig. 4:

Fig. 6 is a detail in cross section taken on the line 6—6 of Fig. 4:

Fig. 7 is a view in cross section taken on the line 7—7 of Fig. 4:

Fig. 8 is a view in section and elevation as seen on the line 8—8 of Fig. 4 in the direction indicated by the arrows:

Fig. 9 is a view in section and elevation taken on the line 9—9 of Fig. 5 as seen in the direction indicated by the arrows:

Fig. 10 is a view in cross section taken on the line 10—10 of Fig. 5:

Fig. 11 is a diagram of the transmission mechanism as seen in side elevation partly in vertical section showing the parts as disposed in their intermediate or second speed position:

Fig. 12 is a diagram similar to that shown in Fig. 11 with the parts disposed in their low speed or low gear position:

Fig. 13 is a diagram showing the parts disposed in their over-running position:

Fig. 14 is a view in section and elevation of the reversing mechanism showing the parts in their neutral position:

Fig. 15 is a view similar to Fig. 14 showing the parts in the direction reversing position:

Referring to the drawings more specifically A indicates generally the transmission gear housing which is affixed to a clutch and fly wheel housing B on a crank shaft housing C of a motor such as an internal combustion engine. Extending into one end of the housing A is a drive shaft D connected with the engine crank shaft and impelled by the engine or motor. Leading from the outer end of the housing A is a driven shaft E and arranged within the housing A and interposed between the shafts D and E are a torque change speed controller F, a pair of change speed gear assemblies G and H, and over-running assembly I, and a direction and neutral gear assembly J.

The torque actuated change speed controller F, particularly shown in Figs. 2 and 3, embodies a cylindrical arrangement of ratchet teeth 16 projecting from one side of a disk 17 screwed by bolts 18 on an end flange 19 formed on the drive shaft D; the teeth 16 projecting in concentric relation to the axis of the shaft D.

Meshing with the teeth 16 is a series of teeth 20 projecting from the end of a cylinder 21 attached by screws 22 to a disk 23 formed with a hub 24 carried on a shaft 25 extending longitudinally of the housing A in axial alignment with the shaft D.

The hub 24 is splined on the shaft 25 to permit longitudinal movement of the shaft relative to the hub 24, and cylinder 21; the shaft 25 being formed with a series of longitudinally extending ribs or teeth 26 which slidably engage longitudinal channels 27 on the inner periphery of the hub 24. The disk 17 is formed with a cylindrical projection 28 protruding in axial alignment with the shaft D and the inner end of the cylinder 21 is closed by an end wall 29 having an inwardly extending annular flange 30 which slidably encompasses the projection 28 for both longitudinal and circumferential movement relative thereto.

Mounted on the other end of the projection 28 is a disk 32 carrying an end thrust bearing 33 and interposed between the bearing 33 and the end wall 29 of the cylinder 21 is a helical spring 34 placed under tension and which acts to normally maintain the cylinder 21 in retracted position with the teeth 20 completely enmeshing with the teeth 16; the spring 34 yieldably opposing longitudinal movement of the teeth 20 away from the teeth 16. The shaft 25 is designed to be shifted longitudinally in one direction by the action of the inclined faces of the teeth 16 riding upwardly on the inclined faces of the teeth 20 and in opposition to a spring 35 (see Figure 4) which bears between the outer end of the shaft 25 and in an end thrust bearing 36 supported relative to the housing A as will presently be described; the spring 35 normally maintaining the shaft 25 in its forwardmost or retracted position with its inner end abutting against the end wall 23 of the cylinder 21.

The shaft 25 is also adapted to be shifted longitudinally by manual operation through the medium of a rock-shaft 37 fitted with a control lever 38 and having a yoke 39 engaging a bearing 40 abutting against a collar 41 on the shaft 25.

The change speed gear assemblies G and H encompass the shaft 25 and embody mechanisms controlled by longitudinal movement of the shaft 25 including friction clutches K and L; the clutch K being interposed between a cylinder 42 and a ring 43 and the clutch L being interposed between a cylinder 44 and a ring 45, which cylinders and rings encircle the shaft 25. The cylinder 44 is mounted in a bearing 46 mounted on a standard 47 carried by the housing A and is formed with a recess 48 carrying the end thrust bearing 36 and spring 35 and into which the outer end of the shaft 25 extends.

Carried by the cylinders 42 and 44 respectively are groups of bell crank levers M and N pivoted at 50 and 51 with their axes extending transversely of the shaft 25 as shown in Fig. 8; the levers M and N having inner arm portions 52 and 53 extending in the direction of the length of the shaft 25 adjacent thereto with the arms extending in corresponding directions and having their outer ends inclined as indicated at 54 and 55 and adapted to be engaged by annular inclined surfaces or cams O and P formed on the shaft 25 on advance movement of the latter; the cam O being arranged close to the ends of the arms 52 when the shaft 25 is in its normal retracted position while the cam P is spaced a greater distance from the arms 53 so that on advance of the shaft 25 longitudinally the cam O will act on the levers M before the cam P operates on the levers N.

The levers M and N have outwardly extending arms 56 and 57 the outer ends of which abut against clutch actuating pins 58 and 59 slidably carried by the cylinders 42 and 44 to move in parallel relation to the shaft 25, the outer ends of pins which abut against crowding rings 60 and 61 of the clutches K and L respectively.

Seating against the outer ends of the lever arms 56 and 57 are rings 62 and 63 which yieldably bear against the arms 56 and 57 under the urge of springs 64 and 65 interposed between the rings 62 and 63 and flanges 66 and 67 carried by the cylinders 42 and 44: the springs 64 and 65 acting to normally maintain the levers M and N in their forwardmost position and operating through the pins 58 and 59 and crowding rings 60 and 61 to maintain the clutches K and L in operative connection with the rings 43 and 45; the clutches K and L embodying a series of friction rings $a$ splined on the cylinders 42 and 44 a series of friction rings $b$ splined on the rings 43 and 45 which friction rings are adapted to co-operate to effect rotation of the cylinders 42 and 44 and rings 43 and 45 collectively with each other on rotation of the rings 43 and 45 as will later be described.

The rings 43 and 45 are each composed of a pair of annular pieces $c$ and $d$ which are disposed face to face and interconnected by pins 68; this construction being employed to facilitate forming the rings with a space $e$ intermediate the ends thereof with which the rings are formed to accommodate externally and internally toothed ring gears 69 and 70 which encircle the shaft 25 in eccentric relation thereto, as particularly shown in Fig. 7, the internal teeth $f$ of which mesh with toothed sections 71 and 72 formed respectively on the shaft 25 and on a hub 73 on the cylinder 42.

The ring gears 69 and 70 are each formed with lateral flanges $g$ extending on opposite sides thereof which are slidably seated in annular channels $h$ formed in the adjacent faces of the ring members $c$ and $d$ constituting the opposed sides of the spaces $e$ whereby the ring gears are held in place and maintained in mesh with the toothed sections 71 and 72. The rings 42 and 43 thus forming mountings for the ring gears 69 and 70.

The outer teeth $i$ on the ring gears 69 and 70 mesh with internal teeth $j$ formed on the inner peripheries of the cylinders 42 and 44 whereby rotation of the ring gears will effect rotation of the cylinders when the parts are in a normal position shown in Figs. 4 and 7, that is with the clutches K and L engaged. On rotation of the shaft 25 the toothed section 71 thereof effects rotation of the ring gear 69 as a unit which in turn effects rotation of the cylinder 42 as a unit; the ring gear 69 then acting as a key whereby the shaft 25 and cylinder 42 are then rotated in unison and through the clutch K carrying the gear mount ring 43 therewith in unison with the shaft 25, ring gear 29 gear mount ring 43 and cylinder 42 revolving collectively as a single body. In like fashion rotation of the cylinder 42 carries with it the ring gear 70 and its associated gear mount ring 45 and cylinder 44. It will thus be seen that the elements G and H just described will normally rotate as a body with the shaft 25. Change speed is effected by releasing the clutches K and L as will presently be described.

It is necessary on effecting release of the clutches K and L that the gear mount rings 43 and 45 be held against rotation relative to the housing A whereby the shaft 25 may revolve independent of the gear mount rings 43 and 45 and whereby the ring gears 69 and 70 will be caused to revolve relative to the shaft 25 and thereby effect rotation of the cylinders 42 and 44. Means are accordingly provided for automatically effecting connection and disconnection of the gear mount rings 43 and 45 relative to the housing A which means is here shown as embodying a pair of internally toothed rings 75 and 76 secured to and carried by the housing A and disposed to encircle the outer members $d$ of the rings 43 and 45 adjacent the peripheries thereof, and mounted for radial reciprocal movement on the members $d$ is a series of bolts 77 and 78 particularly shown in Fig. 6, which bolts are adapted to be moved in and out of engagement with the teeth of the rings 75 and 76 respectively. The bolts 77 and 78 are normally disposed in a retracted position out of engagement with the rings 75 and 76 in opposition to leaf springs k bearing between the heads l of the bolts and the bottom walls m of recesses formed in the periphery of the members d; the bolts being normally retained in such retracted position by latches 79 and 80 carried by the gear mount rings 43 and 45 extending at right angles to the bolts and having beveled outer ends projecting into openings n in stem portions of the bolts.

The latches 79 and 80 are guided in slots o formed in the members d and are fitted with stems p which pass through openings in the ring members c and are rigidly secured to rings 81 and 82 disposed adjacent end rings of the clutches K and L whereby the clutches when in their engaged position will act to maintain the rings 81 and 82 in their advanced positions with the latches 79 and 80 engaged with the bolts 77 and 78, as particularly shown in Fig. 4.

Coil springs q are arranged in recess in the ring members c and bear against the rings 81 and 82 in opposition to the pressure of the clutch rings under the urge of the springs 64 and 65 and which springs q act on release of the clutch members K and L to retract the latches 79 and 80 out of engagement with the bolts 77 and 78 whereupon the bolts will be advanced by the springs k into engagement with the toothed rings 75 and 76 as hereinafter will be more fully described. The member d of the gear mount ring 43 is formed with a hub 83 which is supported in anti-friction bearings 84 carried by a standard 85 in the housing A.

Extending between the hub portion of the cylinder 44 and the shaft E in axial alignment with the latter is a shaft 86 one end of which is revolubly supported in a recess 87 in the hub of the cylinder 44 and the other end of which is revolubly supported in a recess 88 in an enlargement 89 formed on the end of the shaft E and which enlargement is disposed within the housing A adjacent the outer end thereof and is journalled in bearings 90 as particularly shown in Fig. 5.

The over-running element I is associated with the shaft 86 and embodies a spur gear 91 formed on the shaft 86 which meshes with internal teeth r on a ring gear 92 having external teeth s meshing with teeth t on the inner periphery of a drum 93 having an end wall 94 which is affixed to and carried by the cylinder 44 whereby the drum 93 will revolve in unison with the cylinder 44. The ring gear 92 is interposed between a pair of rings u and v of a gear mount 95 in the manner explained with reference to the construction shown in Fig. 4; the gear mount 95 including an end flange 96 which seats on bearings 97 carried on the hub portion of the end wall 94 of the drum 93.

The gear mount 95 is designed to be normally held against rotation relative to the drum 93 so that on rotation of the drum the ring gear 92 will be held by the gear mount 95 against turning relative to the gear 91 and thereby effect a key connection with the latter so that the drum 93, gear mount 95, ring gear 92, gear 91 and shaft 86 will rotate in unison or as a unit.

It is also necessary at times to free the gear mount 95 relative to the drum 93 and to hold it against rotation relative to the housing A and to the shaft 86 and drum 93. Means are accordingly provided for detachably connecting the gear mount 95 with the drum 93 and also for detachably connecting the gear mount 95 to the housing A which means is here shown as comprising a pair of keys 98 and 99 having end portions w and x respectively engageable with notches 100 formed on the inner periphery of the drum 93, as particularly shown in Fig. 5, and which keys also have end portions y and z respectively adapted to be moved in and out of engagement with the teeth of a toothed ring 101 carried by the housing A. The keys 98 and 99 are formed so that their end portions will project radially on diametrically opposite sides of the shaft 86 and for which purpose are formed with intermediate portions having slots 102 through which the shaft 86 and also a hub 103 on the gear mount 95 extend. The keys 98 and 99 have their outer end portions guided in slots 104 formed in the outer end portion of the member v of the gear mount 95 whereby the keys are directed in a radial path of travel relative to the axis of the shaft 86.

Interposed between the keys 98 and 99 and encircling the shaft 86 and hub 103 is a ring 105 having outwardly extending ears 106 and 107 on diametrically opposite marginal portions thereof and to which ears are connected coil springs 108 and 109 the outer ends of which are affixed to pins 110 and 111 projecting from the member v of the gear mount 95. One side of the ring 105 is attached by a pin and slot connection 112 with the key 98 and is attached to the key 99 by a pin and slot connection 113 as particularly shown in Fig. 9; the connections 112 and 113 being arranged on diametrically opposite sides of the shaft 86.

The springs 108 and 109 are arranged to normally maintain the end portions w and x of the keys 98 and 99 in engagement with the notches 100 on the drum 93. As a means for holding the keys thus engaged with the drum against free disengagement a spring detent 114 is mounted in the member v of the gear mount 95 to engage a recess 115 in the key 99 as particularly shown in Fig. 5; the detent 114 acting to oppose retraction of the keys out of engagement with the drum.

Formed on the intermediate portions of the keys 98 and 99 are weights 116 and 117 which are adapted under the action of centrifugal force to effect longitudinal movement of the keys in opposition to the springs 108 and 109 when such force is sufficient to overcome the detent 114 and effect disengagement thereof; such movement of the keys 98 and 99 under the urge of centrifugal force acting to advance the end portions y and z of the keys 98 and 99 into engagement with the toothed ring 101 in which position the detent 114 will engage a recess 118 to yieldably resist immediate retraction of the keys under the urge of the springs 108 and 109 on initial decrease of the centrifugal force thus effecting a delayed disengagement of the keys from the toothed ring 101.

The neutral and reverse gear assembly J is associated with the shaft 86 as shown in Fig. 5 and embodies a sleeve 120 loosely mounted on the shaft 86 to slide longitudinally thereof and also to rotate relative thereto; the sleeve being designed to be shifted longitudinally by manual operation through the medium of a rock shaft 121 fitted with a yoke 122 engaging a peripheral channel 123 on the sleeve 120 and which rock shaft is fitted with a lever 124 by which it may be manually operated.

The sleeve 120 is formed with an end flange 125 on which is mounted a series of spur gears 126, here shown in Fig. 10 as four in number, which gears mesh with elongated gear teeth 127 formed on the outer end portion of the shaft 86. The gears 126 also mesh with elongated gear teeth 128 formed on the inner periphery of an annular flange 129 formed on the enlargement 89 of the shaft E.

The sleeve 120 is normally held against rotation relative to the shaft enlargement 89 by means of teeth 130 formed on the outer periphery of the flange 125 arranged to engage the teeth 128 as particularly shown in Fig. 5. When the sleeve 120 is thus interconnected with the shaft enlargement 89 rotation of the shaft 86 will act through the gears 126 and sleeve 120 to drive the shaft enlargement 89 and shaft E in unison with the shaft 86; the gears 126 then being locked against rotation relative to the shaft 86; sleeve 120 and toothed flange 129 on the shaft enlargement 89.

The sleeve 120 is designed to be shifted to move the teeth 130 thereon out of engagement with the teeth 128 as shown in Fig. 14.

When the sleeve is thus disposed, rotation of the shaft 86 will revolve the gears 126 in a direction opposite that of the shaft 86 and thereby cause the gears to traverse the teeth 130 and annular flange 129, and by reason of the sleeve 120 then being loose causing the latter to revolve relative to the shaft enlargement 89 in unison with the shaft 86.

Carried by the housing A is a ring 131 formed on its inner periphery with teeth 132 which ring and teeth are so arranged that on continued retractive movement of the sleeve 120 the teeth 130 thereon will engage the teeth 132 and then lock the ring 120 against rotation relative to the housing. When the sleeve is thus disposed the gears will still effect gear connection between the shafts 86 and E but by reason of the sleeve being held against turning, rotation of the shaft 86 will act through the gears 126 to drive the shaft E in a reverse direction.

Assuming the parts to be disposed in the normal position shown in Figs. 1, 2, 4, 5, 6 and 9, and also assuming little or no resistance is offered to rotation of the driven shaft E, the operation will be as follows: On rotation of the shaft D the cylinder 21 and shaft 25 of the torque actuated controller F will rotate in unison with the shaft D, and rotation of the shaft 25 effects rotation of the change speed units G and H, the over-running unit I, shaft 86, and shaft E in unison therewith.

On a load being imposed on the shaft E opposing rotation thereof such resistance will be transmitted back through the unit J, shaft 86, units I, H and G, and shaft 25, to the cylinder 21, tending to hold the latter against rotation whereupon rotation of the shaft D under power causes the ratchet teeth 16 to force the ratchet teeth 20 outwardly relative thereto thus causing the shaft 25 to advance longitudinally thereby bringing the cam O into engagement with the arms 52 of the bell crank levers M so as to rock the latter and thereby cause the arms 56 to retract the ring 62 in opposition to the springs 64.

The rings a and b of the clutch K will then be out of frictional engagement, thus releasing the clutch. The springs q will then act on the ring 81 to effect retraction of the latches 79 thereby releasing the bolts 77 and causing the latter to advance under the urge of the springs k into engagement with the toothed ring 75 on the housing A, thereby locking the gear mount ring 43 against rotation, whereupon the revolving shaft 25 will drive the ring gear 69 relative thereto and thus operate through the ring gear to drive the cylinder 42 at a reduced gear ratio due to the differentials in the gear connections between the shaft and ring and between the ring and cylinder. The parts will then be disposed in an intermediate or second speed position as indicated in Fig. 11.

On greater load being imposed on the shaft E such as to cause continued advance of the cylinder 21 and shaft 25 under the urge of the teeth 16 acting on the teeth 20, the cam P will engage the arms 53 of the bell crank levers N so as to rock the latter and cause the arms 57 thereof to retract the rings 63 in opposition to the ring 65 thereby releasing the clutch L and thus freeing the gear mount ring 45 relative to the cylinder 44 and at the same time causing the latches 80 to release the bolts 78 thereby permitting the latter to engage the toothed ring 76 so as to hold the ring 45 against rotation. The revolving cylinder 42 will then act to rotate the ring gear 70 relative thereto thereby effecting rotation of the cylinder 44 at a reduced gear ratio. The parts will then be disposed as shown in Fig. 12, that is in their low gear transmission position.

On decrease of the resistance to rotation of the shaft E after the parts have been disposed in the low gear arrangement the reverse operation will occur as will be readily understood so that the transmission will automatically advance from low gear into intermediate gear and into the normal high gear arrangement; the spring 34 then acting to advance the teeth 20 of the torque controller F from the position shown in Fig. 12 through the position shown in Fig. 11 to the position shown in Fig. 2, thus restoring the elements of the torque control unit F to normal, and at the same time the spring 35 acts to retract the shaft 25 to its normal position thereby successively effecting application of the clutches L and K through the action of the springs 65 and 64, respectively, on the arms 55 and 52 of the bell crank levers M and N riding successively to their normal positions from the clutches P and O. Application of the clutches L and K effect advance movement of the latches 80 and 79 causing the inclined end faces thereof to act on the bolts 78 and 79 to retract the latter out of engagement with the toothed rings 76 and 75 thus freeing the gear mount ring 45 and 43 to effect direct drive from the shaft D to the shaft E.

Manifestly the change speed units G and H will be placed in and out of operation according to variations of the load or resistance imposed on the shaft E.

When the speed of rotation of the shaft 86 is of velocity that the weights 116 and 117, acting as a governor will be advanced so as to retract the end portions w and x of the keys 98 and 99 out of engagement with the drum 93 and advance the end portions y and z into engagement with the stationary ring 101, the unit I will be placed in its over-running operation.

The ring gear 92 will then act to increase the gear ratio between the drive shaft D and the driven shaft E so that one revolution of the drive shaft will effect more than one revolution of the driven shaft according to the gear ratios afforded between the gear 91, ring gear 92, and the drum 93. By this arrangement a motor vehicle equipped with the invention, when under momentum, as when traveling on a down grade, may travel with a greater number of wheel revolutions than the revolutions of the engine crank shaft, which is not possible under the usual direct drive thus effecting an economy in fuel consumption when operating the vehicle on down grade or under momentum with light loads, thus obtaining the benefits of free wheeling without the disadvantages of disconnection of the driven shaft from the engine drive shaft, as is occasioned in free wheeling devices.

On decrease of acceleration of the driven shaft the springs 108 and 109 will restore the keys 98 and 99 to their normal positions so as to again place the driven shaft E in direct drive connection with the change speed element H.

When it is desired to reverse the direction of rotation of the driven shaft E relative to the drive shaft D the rock shaft 121 is operated to retract the sleeve 120 to advance the latter through the neutral position shown in Fig. 14 to reversing position shown in Fig. 15, as previously described; the sleeve 120 being held in neutral position shown in Fig. 14 when it is desired to place the shaft E out of gear connection with the drive shaft.

By the provision of the rock shaft 37 the shaft 25 may be shifted longitudinally under manual control and independent of the torque actuated controller F to place either the change speed unit G in operation, or dispose the units G and H collectively in operation, thus enabling manual selection of either low or intermediate gear connections between the drive and driven shaft as where it is desirable to control movement of the vehicle on downgrade under engine compression. This arrangement also affords means for controlling the various speed changes by manual control in event the automatic torque operated controller F becomes inoperative or ineffectual.

While I have shown and described a specific embodiment of my invention I do not limit myself to the exact details of construction and arrangement shown but may employ such changes and modifications and changes as occasion may require coming within the scope of the appended claims, without departing from the spirit of the invention.

I claim:

1. In a change speed mechanism, a drive shaft, a driven shaft, a reciprocal shaft interposed between said drive and driven shafts in axial alignment therewith, a gear mount revoluble on said reciprocal shaft, a ring gear having internal and external teeth arranged with its internal teeth geared to said reciprocal shaft, a cylinder revolubly supported on said reciprocal shaft, gear teeth on said cylinder meshing with the external teeth on the ring gear, a friction clutch normally interconnecting said gear mount and cylinder, means controlled by longitudinal movement of said reciprocal shaft for placing said clutch in and out of operative relation to said gear mount and cylinder, means for locking said gear mount against rotation on release of said clutch, transmission means for driving said driven shaft from said cylinder, and torque controlled means for reciprocating said reciprocal shaft.

2. The structure called for in claim 1 including in said transmission means a ring gear geared to said cylinder, a gear mount carrying said ring gear, a revoluble cylinder geared to said ring gear, a normally applied clutch connecting said gear mount and cylinder, means controlled by reciprocation of said reciprocal shaft for placing said clutch in and out of operation, and means for locking said gear mount against rotation during release of said clutch.

3. In a change speed transmission, a drive shaft, a driven shaft, a reciprocal shaft interposed between said drive and said driven shafts, a torque controller connecting said drive shaft and reciprocal shaft adapted to effect rotation and longitudinal movement of the latter, gear teeth on said reciprocal shaft, a ring gear having internal and external gear teeth arranged with its internal teeth meshing with the teeth on said reciprocal shaft, a cylinder, gear teeth on said cylinder meshing with the external teeth on said ring gear, a friction clutch, means controlled by said clutch for placing said cylinder and ring gear in and out of gear relation to said reciprocal shaft, means actuated by longitudinal movement of said reciprocal shaft controlling said clutch, and means connected with said cylinder for driving said driven shaft.

4. In a change speed mechanism, a drive shaft, a driven shaft, a reciprocal shaft interposed between said drive and driven shafts in axial alignment therewith, a gear mount revoluble on said reciprocal shaft, a ring gear having internal and external teeth arranged with its internal teeth geared to said reciprocal shaft, a cylinder revolubly supported on said reciprocal shaft, gear teeth on said cylinder meshing with the external teeth on the ring gear, a friction clutch normally interconnecting said gear mount and cylinder, means controlled by longitudinal movement of said reciprocal shaft for placing said clutch in and out of operative relation to said gear mount and cylinder, means for locking said gear mount against rotation on release of said clutch, transmission means for driving said driven shaft from said cylinder, and means for reciprocating said reciprocal shaft.

5. In a change speed transmission, a drive shaft, a driven shaft, a reciprocal shaft interposed between said drive and said driven shafts, a control means connecting said drive shaft and reciprocal shaft adapted to effect rotation and longitudinal movement of the latter, gear teeth on said reciprocal shaft, a ring gear having internal and external gear teeth arranged with its internal teeth meshing with the teeth on said reciprocal shaft, a cylinder, gear teeth on said cylinder meshing with the external teeth on said ring gear, a friction clutch, means controlled by said clutch for placing said cylinder and ring gear in and out of gear relation to said reciprocal shaft, means actuated by longitudinal movement of said reciprocal shaft controlling said clutch, and means connected with said cylinder for driving said driven shaft.

6. In a change speed transmission, a drive shaft, a driven shaft, a reciprocal shaft interposed between said drive and driven shafts, means connecting said drive shaft and reciprocal shaft adapted to effect rotation of the latter, manually operated means for effecting longitudinal movement of said reciprocal shaft, gear teeth on said reciprocal shaft, a ring gear having internal and external gear teeth arranged with its internal teeth meshing with the teeth on said reciprocal shaft, a cylinder, gear teeth on said cylinder meshing with the external teeth on said ring gear, a friction clutch, means controlled by said clutch for placing said cylinder and ring gear in and out of gear relation to said reciprocal shaft, means actuated by longitudinal movement of said reciprocal shaft controlling said clutch, and means connected with said cylinder for driving said driven shaft.

CLYDE A. ROEDER.